(12) United States Patent
Kim et al.

(10) Patent No.: US 11,875,184 B1
(45) Date of Patent: Jan. 16, 2024

(54) METHOD AND APPARATUS FOR TRANSLATING MEMORY ADDRESSES IN MANYCORE SYSTEM

(71) Applicant: MetisX CO., Ltd., Yongin-si (KR)

(72) Inventors: Ju Hyun Kim, Yongin-si (KR); Jae Wan Yeon, Yongin-si (KR); Kwang Sun Lee, Yongin-si (KR)

(73) Assignee: MetisX CO., Ltd., Yongin-si (KR)

( * ) Notice: Subject to any disclaimer, the term of this patent is extended or adjusted under 35 U.S.C. 154(b) by 0 days.

(21) Appl. No.: 18/474,725

(22) Filed: Sep. 26, 2023

(30) Foreign Application Priority Data

Feb. 17, 2023 (KR) .................. 10-2023-0021250

(51) Int. Cl.
*G06F 9/48* (2006.01)
*G06F 9/54* (2006.01)

(52) U.S. Cl.
CPC ............ *G06F 9/4881* (2013.01); *G06F 9/544* (2013.01)

(58) Field of Classification Search
CPC ............................... G06F 9/4881; G06F 9/544
See application file for complete search history.

(56) References Cited

U.S. PATENT DOCUMENTS

| | | |
|---|---|---|
| 2005/0108497 A1 | 5/2005 | Bridges et al. |
| 2008/0172524 A1* | 7/2008 | Singh .................. G06F 12/1027 711/108 |
| 2009/0193287 A1 | 7/2009 | Jeong |
| 2012/0290793 A1 | 11/2012 | Chung et al. |
| 2021/0089469 A1* | 3/2021 | Zhu ..................... G06F 13/4027 |

FOREIGN PATENT DOCUMENTS

| | | |
|---|---|---|
| KR | 10-2009-0082781 A | 7/2009 |
| KR | 10-2014-0045364 A | 4/2014 |

OTHER PUBLICATIONS

"Request for the Submission of an Opinion" Office Action issued in KR 10-2023-0021250; mailed by the Korean Intellectual Property Office dated Apr. 12, 2023.
"Written Decision on Registration" Office Action issued in KR 10-2023-0021250; mailed by the Korean Intellectual Property Office dated Jul. 21, 2023.

* cited by examiner

*Primary Examiner* — Wissam Rashid
(74) *Attorney, Agent, or Firm* — Studebaker & Brackett PC

(57) ABSTRACT

A method for translating memory addresses in a manycore system is provided, which is executed by one or more processors, and includes receiving identification information of a thread accessing a memory associated with one or more cores of a cluster that includes a plurality of cores, receiving a virtual address of data accessed by the thread, and determining a physical address of data in the memory based on the virtual address and the identification information of the thread.

9 Claims, 5 Drawing Sheets

METHOD AND APPARATUS FOR TRANSLATING MEMORY ADDRESSES IN MANYCORE SYSTEM

CROSS-REFERENCE TO RELATED APPLICATION

This application claims priority to Korean Patent Application No. 10-2023-0021250, filed in the Korean Intellectual Property Office on Feb. 17, 2023, the entire contents of which are hereby incorporated by reference.

BACKGROUND

Field

The disclosure relates to a method and apparatus for translating memory addresses in a manycore system, and more specifically, to a method and apparatus for determining a physical address of data in a memory based on a virtual address of data accessed by a thread and identification information of the thread.

Description of Related Art

In general, a manycore system may refer to a computer architecture with multiple processor cores on a single chip. The manycore system can distribute the workload of the program requested by the host processor to multiple process cores, thereby improving the performance of parallel computing work for the corresponding workload. Since the manycore system can provide significant performance improvements compared to the existing single-core, dual-core systems, etc., demand is increasing in fields that require a large amount of computing resources, such as artificial intelligence model learning.

Meanwhile, a bare-metal system may refer to a computer system without a basic operating system or virtualization layer, in which a program or thread may be directly executed on physical hardware. That is, in the bare-metal system, threads, etc. can be executed directly on physical hardware components such as CPU, memory, storage without intervention of the operating system. The bare-metal system is widely used in applications that require direct access to hardware resources and low-level control, such as real-time systems, embedded systems, high-performance computing.

The multi-threading technique used in the existing manycore system generally translates a virtual address of a thread into a physical address in the memory with the support of the operating system. However, the existing technique is applicable only in an environment with the operating system, and also requires additional computing resources to execute the operating system. Therefore, the method of address translation according to the existing multi-threading technique has a problem in that it is difficult to use in a bare-metal system. Another problem is that it is inefficient to use this technique in a system designed for a specific function or purpose, and that it is also difficult to use this in an embedded environment where computing resources are insufficient.

SUMMARY

In order to solve one or more problems (e.g., the problems described above and/or other problems not explicitly described herein), the present disclosure provides a method for, a non-transitory computer-readable recording medium storing instructions for, and a system (apparatus) for translating memory addresses in a manycore system.

The present disclosure may be implemented in a variety of ways, including a method, a system (apparatus), or a non-transitory computer-readable recording medium storing instructions.

A method for translating memory addresses in a manycore system is provided, which may be executed by one or more processors and include receiving identification information of a thread accessing a memory associated with one or more cores of a cluster that includes a plurality of cores, receiving a virtual address of data accessed by the thread, and determining a physical address of data in the memory based on the virtual address and the identification information of the thread.

The determining the physical address of the data may include determining a start address of a segment where the data is included based on the virtual address, calculating an address correction value associated with the thread based on the identification information of the thread, and determining an address obtained by adding the address correction value to the start address of the segment as the physical address of the data.

The determining the start address of the segment may include determining the start address of the segment based on the virtual address and a value of a register associated with the segment where the data is included.

A size of the segment may be determined based on user input.

The size of the segment may be determined based on a size of a data structure of the data.

The calculating the address correction value associated with the thread may include calculating the address correction value by performing a shift-left operation on a value of the identification information of the thread based on the size of the segment.

The method may be performed by the core without intervention of an operating system of the manycore system.

The method may further include receiving information on a size of an area of the virtual address and the starting point of the area, and the determining the physical address of the data may include determining a physical address of the data based on the size of the area of the virtual address, information on the starting point of the area, and the identification information of the thread.

A computer program is provided, which is stored on a computer-readable recording medium for executing, on a computer, the method described above according to the embodiment.

A manycore system is provided, which may include one or more clusters including a plurality of cores, and a memory access module that controls access to a memory associated with one or more cores of the one or more clusters, in which the memory access module may be configured to receive the identification information of the thread accessing the memory, receive a virtual address of data accessed by the thread, and determine a physical address of the data in the memory based on the virtual address and the identification information of the thread.

According to various examples of the disclosure, in a manycore system including a plurality of cores, memory address translation is performed by hardware on which threads will be executed without intervention of the operating system, thereby reducing the occurrence of overhead according to address translation, and enabling efficient use of the computing resources of the manycore system.

According to various examples of the disclosure, memory address translation can be performed resource-efficiently even in a system used only for a specific function or purpose or in an embedded environment lacking computing resources.

The effects of the present disclosure are not limited to the effects described above, and other effects not described herein can be clearly understood by those of ordinary skill in the art (hereinafter referred to as "ordinary technician") from the description of the claims.

BRIEF DESCRIPTION OF THE DRAWINGS

Embodiments of the disclosure will be described with reference to the accompanying drawings described below, wherein like reference numbers indicate like elements, but are not limited thereto.

DETAILED DESCRIPTION

Figure 1:
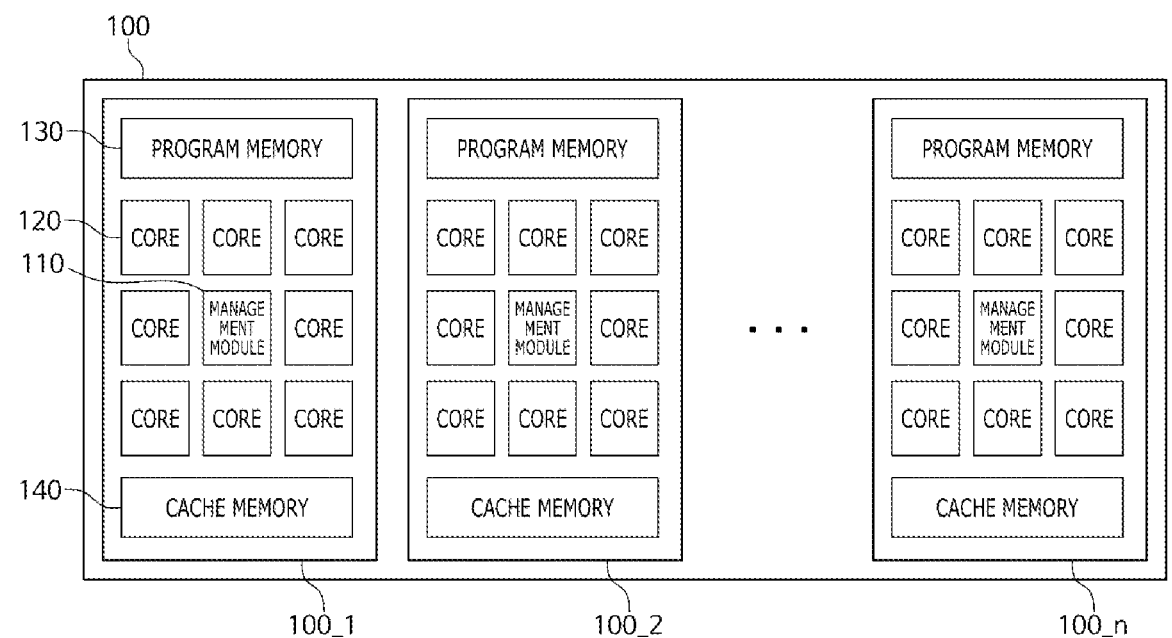
FIG. 1 is a block diagram illustrating an internal configuration of a manycore system.

Hereinafter, example details for the practice of the present disclosure will be described in detail with reference to the accompanying drawings. However, in the following description, detailed descriptions of well-known functions or configurations will be omitted if it may make the subject matter of the present disclosure rather unclear.

In the accompanying drawings, the same or corresponding components are assigned the same reference numerals. In addition, in the following description of various examples, duplicate descriptions of the same or corresponding components may be omitted. However, even if descriptions of components are omitted, it is not intended that such components are not included in any example.

Advantages and features of the disclosed examples and methods of accomplishing the same will be apparent by referring to examples described below in connection with the accompanying drawings. However, the disclosure is not limited to the examples disclosed below, and may be implemented in various forms different from each other, and the examples are merely provided to make the disclosure complete, and to fully disclose the scope of the disclosure to those skilled in the art to which the disclosure pertains.

The terms used herein will be briefly described prior to describing the disclosed example(s) in detail. The terms used herein have been selected as general terms which are widely used at present in consideration of the functions of the disclosure, and this may be altered according to the intent of an operator skilled in the art, related practice, or introduction of new technology. In addition, in specific cases, certain terms may be arbitrarily selected by the applicant, and the meaning of the terms will be described in detail in a corresponding description of the example(s). Therefore, the terms used in the disclosure should be defined based on the meaning of the terms and the overall content of the disclosure rather than a simple name of each of the terms.

As used herein, the singular forms "a," "an," and "the" are intended to include the plural forms as well, unless the context clearly indicates the singular forms. Further, the plural forms are intended to include the singular forms as well, unless the context clearly indicates the plural forms. Further, throughout the description, when a portion is stated as "comprising (including)" a component, it is intended as meaning that the portion may additionally comprise (or include or have) another component, rather than excluding the same, unless specified to the contrary.

Further, the term "module" or "unit" used herein refers to a software or hardware component, and "module" or "unit" performs certain roles. However, the meaning of the "module" or "unit" is not limited to software or hardware. The "module" or "unit" may be configured to be in an addressable storage medium or configured to play one or more processors. Accordingly, as an example, the "module" or "unit" may include components such as software components, object-oriented software components, class components, and task components, and at least one of processes, functions, attributes, procedures, subroutines, program code segments, drivers, firmware, micro-codes, circuits, data, database, data structures, tables, arrays, and variables. Furthermore, functions provided in the components and the "modules" or "units" may be combined into a smaller number of components and "modules" or "units", or further divided into additional components and "modules" or "units."

The "module" or "unit" may be implemented as a processor and a memory. The "processor" should be interpreted broadly to encompass a general-purpose processor, a central processing unit (CPU), a microprocessor, a digital signal processor (DSP), a controller, a microcontroller, a state machine, and so forth. Under some circumstances, the "processor" may refer to an application-specific integrated circuit (ASIC), a programmable logic device (PLD), a field-programmable gate array (FPGA), and so on. The "processor" may refer to a combination for processing devices, e.g., a combination of a DSP and a microprocessor, a combination of a plurality of microprocessors, a combination of one or more microprocessors in conjunction with a DSP core, or any other combination of such configurations. In addition, the "memory" should be interpreted broadly to encompass any electronic component that is capable of storing electronic information. The "memory" may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, and so on. The memory is said to be in electronic communication with a processor if the processor can read information from and/or write information to the memory. The memory integrated with the processor is in electronic communication with the processor.

In this disclosure, "offloading" may refer to transferring data from a local device or network to another device or network so as to reduce the amount of data that needs to be processed or stored in the local device or network.

In the disclosure, a "task" may refer to a unit of work to be performed by a processor or such unit work. For example, a "task" may be a stand-alone work or a set of works that must be completed in a specific order.

In the disclosure, a "thread" may refer to a unit execution flow within a process. Alternatively, the "thread" may refer to a particular memory space on a memory to which such execution flow is allocated.

In the disclosure, "address translation" may refer to translating an address in a virtual memory space allocated to a processor or thread into a corresponding physical address in a physical memory.

In the disclosure, a "shift-left operation" may refer to a bit operation that shifts bits of a binary number to the left by a specified number of positions. For example, performing the shift-left operation by 2 on binary number 1001 may result in binary number 100100.

FIG. 1 is a block diagram illustrating an internal configuration of a manycore system 100. As illustrated, the manycore system 100 may include a plurality of clusters 100_1 to 100_n each including a plurality of cores 120 (where, n is a natural number). The manycore system 100 may be a computing structure that can be further expanded by including a larger number of clusters using a cluster as a basic unit.

Each of the plurality of clusters 100_1 to 100_n may include a management module 110, a plurality of cores 120, a program memory 130, and a cache memory 140, but is not limited to that illustrated in FIG. 1. For example, each of the plurality of clusters 100_1 to 100_n may further include a co-processor. The co-processor may be individually included and used in each of the plurality of cores 120 according to the required performance or functional characteristics of the manycore system 100 or cluster, or may be shared and used by the plurality of cores 120.

The program may be executed by a plurality of threads in the plurality of clusters 100_1 to 100_n. For example, the program may be executed by a plurality of threads allocated to one cluster (or to a plurality of cores included in one cluster) or may be executed by a plurality of threads allocated to several clusters (or to a plurality of cores included in each of the several clusters).

A plurality of threads may be simultaneously executed in each of the plurality of cores 120. For example, if 10 cores are included in one cluster and each of the 10 cores can simultaneously execute 4 threads, the number of threads that can be simultaneously executed in the corresponding cluster may be 40.

The management module 110 may perform management works associated with the threads and control the execution of the plurality of cores 120. For example, the management module 110 may generate a thread for each of one or more tasks based on work information associated with the one or more tasks according to the offloading request of the host processor from the host processor and allocate the generated thread to one or more cores of the cluster that includes a plurality of cores.

Each of the plurality of cores 120 is a single processing unit capable of executing commands, and each core may execute a separate program or one or more threads. Hardware-wise, each of the plurality of cores 120 may be configured to simultaneously execute a plurality of threads. As the components for supporting the simultaneous execution, each of the plurality of cores 120 may include a program counter, a thread register file, etc. which track an execution flow for each thread. Additionally, each of the plurality of cores 120 may further include several execution units, L0 cache (level 0 caches or micro-operation cache) memories, etc. With this configuration, each of the plurality of cores 120 may be capable of parallel processing of the threads.

The method for translating memory addresses according to the disclosure may be performed by each of the plurality of cores 120 without intervention of the operating system of the manycore system 100.

The program memory 130 may refer to a memory used by the programs or threads executed in the system. The program memory 130 may be used for storing program codes and data currently being used by a program or thread. Each of the plurality of clusters 100_1 to 100_n may execute the same program by sharing one program memory 130. Alternatively, depending on the configuration of the program memory 130, each of the plurality of clusters 100_1 to 100_n may also execute several different programs.

The cache memory 140 may refer to a small amount of high-speed memory used for storing frequently accessed data. In the manycore system 100, a plurality of cores may have their own cache memory 140 or share the memory, according to which the number of times the plurality of cores 120 have to access main memory (e.g., RAM) for loading or storing data can be reduced, thereby improving performance. The cache memory 140 may include a L1 (level 1) cache memory.

The manycore system 100 may include a memory, a processor, a communication module, and/or an input and output interface. For example, the manycore system 100 may be configured to communicate information and/or data through a network using a communication module. The manycore system 100 may be configured to communicate information and/or data with a host processor through a network using a communication module.

The memory may include any non-transitory computer readable medium. The memory may include a permanent mass storage device such as random access memory (RAM), read only memory (ROM), disk drive, solid state drive (SSD), flash memory, etc. As another example, a non-perishable mass storage device such as a ROM, SSD, flash memory, disk drive, etc. may be included in the manycore system 100 as a separate permanent storage device separate from the memory. In addition, an operating system and/or one program code may be stored in the memory. The memory may include a program memory and/or a cache memory, and the cache memory may include L0 cache memory and/or L1 cache memory.

These software components may be loaded from a computer-readable recording medium separate from the memory. Such a separate computer-readable recording medium may include a recording medium directly connectable to the manicore system 100, and may include, for example, a computer-readable recording medium such as a floppy drive, a disk, a tape, a DVD/CD-ROM drive, a memory card, etc. As another example, the software components may be loaded into the memory through the communication module rather than the computer-readable recording medium. For example, at least one program may be loaded into the memory based on a computer program installed by files provided by developers or a file distribution system that distributes application installation files through the communication module.

The processor may be configured to process commands of a computer program by performing basic arithmetic, logic, and input and output operations. The commands may be provided to a user terminal (not illustrated) or another external system by the memory or the communication module. In addition, the processor may be configured to manage, process, and/or store the information and/or data received from a plurality of user terminals and/or a plurality of external systems. The processor may include a plurality of cores, and a thread may be allocated to and processed on each of the plurality of cores.

The communication module may provide a configuration or function for the user terminal and the manycore system 100 to communicate with each other through a network, and may provide a configuration or function for the manycore system 100 to communicate with an external system (for example, a separate host processor). For example, control signals, commands, data, etc. provided under the control of the processor of the manycore system 100 may be transmitted to the user terminal and/or the external system through the communication module of the user terminal and/or the external system through the communication module and the network.

In addition, the input and output interface of the manycore system 100 may be connected to the manycore system 100 or may be a means for interfacing with a device (not illustrated) for inputting or outputting which may be included in the manycore system 100. The input and output interface may be configured separately from the processor, but is not limited thereto, and may be omitted from the manycore system 100 or included in the processor.

Figure 2:
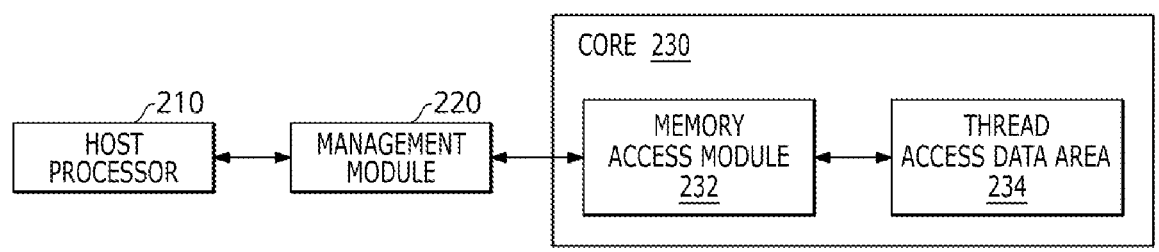
FIG. 2 is a diagram illustrating a host processor, a management module and a core of a manycore system.

FIG. 2 is a diagram illustrating a host processor 210, and a management module 220 and a core 230 of the manycore system. The management module 220 (or the manycore system including the management module 220) may generate a thread for each of the one or more tasks based on the work information associated with the one or more tasks according to an offloading request from the host processor 210, and then allocate the generated thread to the core 230 of a cluster that includes a plurality of cores.

The management module 220 may receive, from the host processor 210, translation setting information required to determine a physical address of data in the memory accessed by the thread. A process of determining the translation setting information will be described below in detail with reference to FIG. 3. The translation setting information may include a size of an area of the virtual address of the data accessed by the thread and information on a starting point of the area, a start address of a segment in the memory corresponding to the area of the virtual address, size information of the corresponding segment, etc.

A register may be generated or set based on the translation setting information. The register may include a start address of a segment in the memory (or a thread access data area 234) where the data accessed by the thread is included, and size information of the segment. That is, the start address, etc. of the segment where the data accessed by the thread is included may be determined based on the register and the virtual address allocated with the thread.

A memory access module 232 may determine a physical address of data in the memory (or thread access data area 234) accessed by the thread, based on the translation setting information and identification information of the thread. Specifically, the memory access module 232 may determine a physical address based on the register generated from translation setting information, the virtual address of the thread, and the identification information of the thread. This will be described in detail below with reference to FIG. 4.

Figure 3:
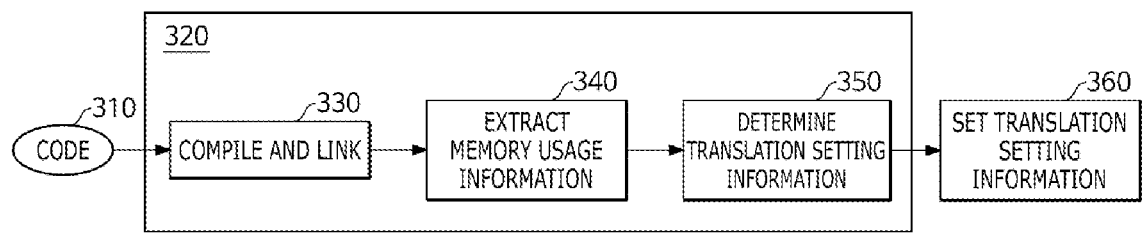
FIG. 3 is a diagram illustrating a process of determining and setting translation setting information.

FIG. 3 is a diagram illustrating a process of determining and setting translation setting information. A process 320 of determining the translation setting information may be performed by an external compiler (or host processor). The process 320 of determining the translation setting information may be initiated by compiling and linking a code 310 of a program to be executed through the manycore system (or core) (330).

Memory usage information may be extracted from the compiled code (340). Specifically, the memory usage information may include size information of the data disposed in each of the segments, and the data disposed in each of the segments may be the data that is adjusted to be divided and allocated to each of a plurality of segments from the time the code 310 is written.

The translation setting information may be determined (350). The translation setting information may include the size of an area of the virtual address, information on a starting point of the area, a start address of a segment in the memory corresponding to the area of the virtual address, size information of a corresponding segment, etc. Specifically, the translation setting information may be determined by a user rearranging a specific data structure or a segment allocated with a thread, or re-allocating the data structure or thread to an appropriate segment. Alternatively, the segment (or size of segment) allocated with a specific data structure or thread may be determined based on a size of a data structure of the data. With this configuration, the size of each data structure included in the program may be set to be smaller than the size of the segment.

In the process of loading a program from the host processor to the manycore system, the translation setting information may be set in at least some of the plurality of cores of the cluster included in the manycore system (360). Specifically, upon program loading, a register associated with the translation setting information may be set. For example, the register may include the start address, size information, etc. of each segment, and the start address, etc. of the segment where the data accessed by the thread is included may be determined based on the register and the virtual address allocated with the thread.

Figure 4:
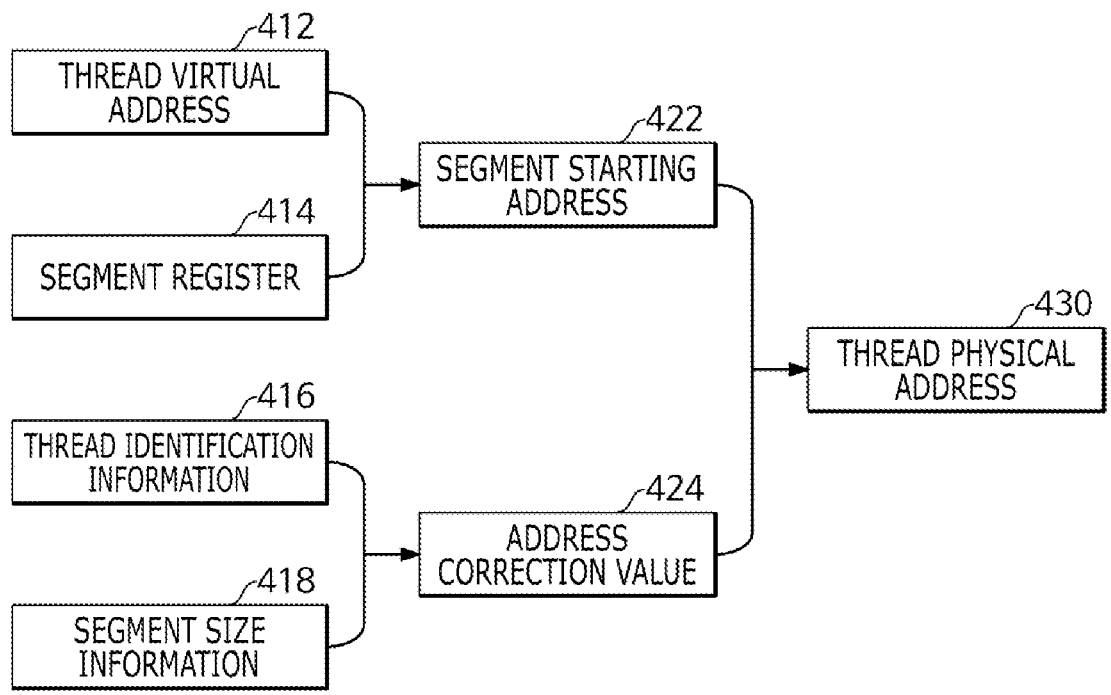
FIG. 4 is a diagram illustrating a process of determining a thread physical address.

FIG. 4 is a diagram illustrating a process of determining a thread physical address 430. The thread physical address 430 may refer to a physical address of data in the memory associated with the core accessed by the thread. The thread physical address 430 may be determined by adding an address correction value 424 to a segment start address 422 in the memory where the data in memory accessed by the thread is included.

The segment start address 422 may be determined based on a virtual address 412 of the data accessed by the thread and a segment register 414 associated with the segment where the data accessed by the thread is included. For example, the segment register 414 may include information associated with the start address of each segment and the size of each segment. If a segment allocated with a thread is determined based on the thread virtual address 412, the segment start address 422 may be determined from the segment register 414 associated with the corresponding segment.

The address correction value 424 may be calculated based on thread identification information 416 and segment size information 418. The address correction value 424 may be calculated by performing a shift-left operation on the value of the thread identification information 416 based on the segment size information 418. In this case, the shift-left operation may be performed based on a log value of the segment size. For example, if the size of a segment allocated with a thread is 8 Mb, the value of $\log_2(8\,M)$ is 23, and accordingly, a shift-left operation by 23 can be performed on the value of the thread identification information 416. Since the thread identification information 416 corresponds to a unique value assigned to each thread, this configuration allows to ensure an independent memory address space for each thread.

Figure 5:
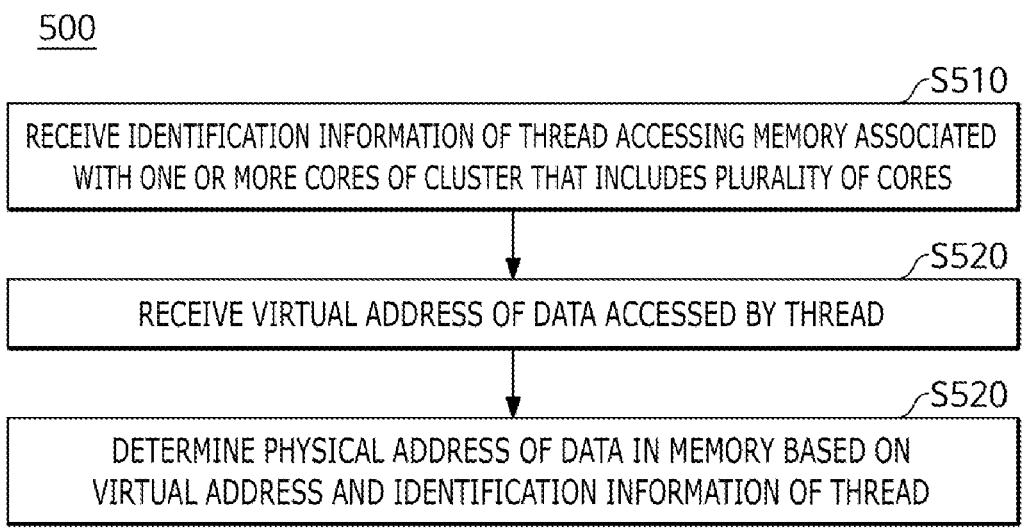
FIG. 5 is a flowchart illustrating a method for translating memory addresses in a manycore system.

FIG. 5 is a flowchart illustrating a method 500 for translating memory addresses in a manycore system. The method 500 for translating memory addresses in a manycore system may be performed by a processor (e.g., one or more processors of the memory access module). The method 500 for translating memory addresses in the manycore system may be initiated by the processor receiving identification information of a thread accessing a memory associated with one or more cores of a cluster that includes a plurality of cores, at S510.

The processor may receive a virtual address of the data accessed by the thread, at S520.

The processor may determine a physical address of data in the memory based on the virtual address and the identification information of the thread, at S530.

The processor may determine a start address of a segment where the data is included, calculate an address correction value associated with the thread based on the identification information of the thread, and determine an address obtained by adding the address correction value to the start address of the segment as a physical address of the data.

The processor may determine the start address of the segment based on a value of the register associated with the segment where data is included based on the virtual address. In addition, the size of the segment may be determined based on a user input or based on a size of a data structure of the data.

The processor may calculate the address correction value by performing a shift-left operation on a value of the identification information of the thread based on the size of the segment.

The processor may receive information on the size and the starting point of the area of the virtual address, and determine the physical address of the data based on the information on the size and the starting point of the area of the virtual address and the identification information of the thread.

The method 500 for translating memory addresses may be performed by the core (or the memory access module) without intervention of an operating system of the manycore system.

The flowchart illustrated in FIG. 5 and the above description are merely examples, and may be implemented differently in some other examples. For example, in some examples, the order of respective steps may be changed, some steps may be repeatedly performed, some steps may be omitted, or some steps may be added.

The method described above may be provided as a computer program stored in a computer-readable recording medium for execution on a computer. The medium may be a type of medium that continuously stores a program executable by a computer, or temporarily stores the program for execution or download. In addition, the medium may be a variety of recording means or storage means having a single piece of hardware or a combination of several pieces of hardware, and is not limited to a medium that is directly connected to any computer system, and accordingly, may be present on a network in a distributed manner. An example of the medium includes a medium configured to store program instructions, including a magnetic medium such as a hard disk, a floppy disk, and a magnetic tape, an optical medium such as a CD-ROM and a DVD, a magnetic-optical medium such as a floptical disk, and a ROM, a RAM, a flash memory, and so on. In addition, other examples of the medium may include an app store that distributes applications, a site that supplies or distributes various software, and a recording medium or a storage medium managed by a server.

The methods, operations, or techniques of the disclosure may be implemented by various means. For example, these techniques may be implemented in hardware, firmware, software, or a combination thereof. Those skilled in the art will further appreciate that various illustrative logical blocks, modules, circuits, and algorithm steps described in connection with the disclosure herein may be implemented in electronic hardware, computer software, or combinations of both. To clearly illustrate this interchangeability of hardware and software, various illustrative components, blocks, modules, circuits, and steps have been described above generally in terms of their functionality. Whether such a function is implemented as hardware or software varies according to design requirements imposed on the particular application and the overall system. Those skilled in the art may implement the described functions in varying ways for each particular application, but such implementation should not be interpreted as causing a departure from the scope of the disclosure.

In a hardware implementation, processing units used to perform the techniques may be implemented in one or more ASICs, DSPs, digital signal processing devices (DSPDs), programmable logic devices (PLDs), field programmable gate arrays (FPGAs), processors, controllers, microcontrollers, microprocessors, electronic devices, other electronic units designed to perform the functions described in the disclosure, computer, or a combination thereof.

Accordingly, various example logic blocks, modules, and circuits described in connection with the disclosure may be implemented or performed with general purpose processors, DSPs, ASICs, FPGAs or other programmable logic devices, discrete gate or transistor logic, discrete hardware components, or any combination of those designed to perform the functions described herein. The general purpose processor may be a microprocessor, but in the alternative, the processor may be any related processor, controller, microcontroller, or state machine. The processor may also be implemented as a combination of computing devices, for example, a DSP and microprocessor, a plurality of microprocessors, one or more microprocessors associated with a DSP core, or any other combination of the configurations.

In the implementation using firmware and/or software, the techniques may be implemented with instructions stored on a computer-readable medium, such as random access memory (RAM), read-only memory (ROM), non-volatile random access memory (NVRAM), programmable read-only memory (PROM), erasable programmable read-only memory (EPROM), electrically erasable PROM (EEPROM), flash memory, compact disc (CD), magnetic or optical data storage devices, and the like. The commands may be executable by one or more processors, and may cause the processor(s) to perform certain aspects of the functions described in the disclosure.

Although the examples described above have been described as utilizing aspects of the currently disclosed subject matter in one or more standalone computer systems, aspects are not limited thereto, and may be implemented in conjunction with any computing environment, such as a network or distributed computing environment. Furthermore, the aspects of the subject matter in the disclosure may be implemented in multiple processing chips or devices, and storage may be similarly influenced across a plurality of devices. Such devices may include PCs, network servers, and portable devices.

Although the disclosure has been described in connection with some examples herein, various modifications and changes can be made without departing from the scope of the disclosure, which can be understood by those skilled in the art to which the disclosure pertains. In addition, such modifications and changes should be considered within the scope of the claims appended herein.

The invention claimed is:

1. A method for translating memory addresses in a many-core system, the method being executed by one or more processors and comprising:

after a thread associated with one or more tasks according to an offloading request from a host processor is created and assigned to one or more cores of a cluster that includes a plurality of cores, receiving, by a memory access module of the one or more cores, translation setting information for determining a physical address of data in a memory associated with the one or more cores accessed by the thread;

receiving, by the memory access module, identification information of the thread accessing the memory;

receiving, by the memory access module, a virtual address of data accessed by the thread; and determining, by the memory access module, a physical address of the data in the memory based on the translation setting information, the virtual address, and the identification information of the thread, wherein the method is performed by the core without intervention of an operating system of the manycore system.

2. The method according to claim 1, wherein the determining the physical address of the data includes:

determining a start address of a segment where the data is included based on the virtual address;

calculating an address correction value associated with the thread based on the identification information of the thread; and determining an address obtained by adding the address correction value to the start address of the segment as the physical address of the data.

3. The method according to claim 2, wherein the determining the start address of the segment includes determining the start address of the segment based on the virtual address and a value of a register associated with the segment where the data is included.

4. The method according to claim 2, wherein a size of the segment is determined based on user input.

5. The method according to claim 2, wherein a size of the segment is determined based on a size of a data structure of the data.

6. The method according to claim 2, wherein the calculating the address correction value associated with the thread includes calculating the address correction value by performing a shift-left operation on a value of the identification information of the thread based on a size of the segment.

7. The method according to claim 1, wherein the translation setting information includes information on a size of an area of the virtual address and a starting point of the area, and the determining the physical address of the data includes determining a physical address of the data based on the size of the area of the virtual address, information on the starting point of the area, and the identification information of the thread.

8. A non-transitory computer-readable recording medium storing instructions for execution by the one or more processors that, when executed by the one or more processors, cause the one or more processors to perform the method according to claim 1.

9. A manycore system comprising:

one or more clusters comprising a plurality of cores; and a memory access module that controls access to a memory associated with one or more cores of the one or more clusters, wherein the memory access module is configured to:

after a thread associated with one or more tasks according to an offloading request from a host processor is created and allocated to the one or more cores, receive translation setting information for determining a physical address of data in a memory associated with the one or more cores accessed by the thread;

receive the identification information of the thread accessing the memory;

receive a virtual address of data accessed by the thread; and determine a physical address of the data in the memory based on the translation setting information, the virtual address, and the identification information of the thread, and the determining is performed by the memory access module without intervention of an operating system of the manycore system.

* * * * *